Sept. 20, 1971 — B. MEKSULA — 3,606,005

FISHING TACKLE BOX

Filed Dec. 29, 1969 — 3 Sheets-Sheet 1

INVENTOR.
BERNARD MEKSULA
BY
Isler & Ornstein
ATTORNEYS

United States Patent Office 3,606,005
Patented Sept. 20, 1971

3,606,005
FISHING TACKLE BOX
Bernard Meksula, 13215 Maple Ave.,
Garfield Heights, Ohio 44105
Filed Dec. 29, 1969, Ser. No. 888,587
Int. Cl. A45c *11/26;* B65d *85/54*
U.S. Cl. 206—16R 7 Claims

ABSTRACT OF THE DISCLOSURE

A fishing tackle box is provided comprising a box or shell and a tier of bait trays so arranged and latched to each other as to permit ready access to any tray without disturbing the other trays. The tier of trays is so disposed within the box as to permit easy access to each tray, while providing a substantial volume of space within the box for items not usually carried in the trays. A unique latching mechanism is provided which latches the trays to each other and occupies little or no space within the box.

---

This invention relates, as indicated, to a fishing tackle box.

A primary object of the invention is to provide a box of the character described, having a tier of bait trays so arranged and latched to each other as to not only permit ready access to any tray without disturbing the contents of the other trays, but also to permit ready access to space within the box below the trays, without releasing the trays from each other.

Another object of the invention is to provide an arrangement of trays so positioned or supported within the box as to provide substantial space within the box for fishing equipment or items not usually carried in trays.

A further object of the invention is to provide a novel latching mechanism for latching the trays to each other and the cover to the uppermost tray, which mechanism occupies virtually none of the space within the box.

Other objects and advantages of my invention will be apparent during the course of the following description.

In the accompanying drawings forming a part of this specification, and in which like numerals are employed to designate like parts throughout the same, FIG. 1 is a fragmentary plan view of the fishing tackle box, in the open condition;

Figure 1:
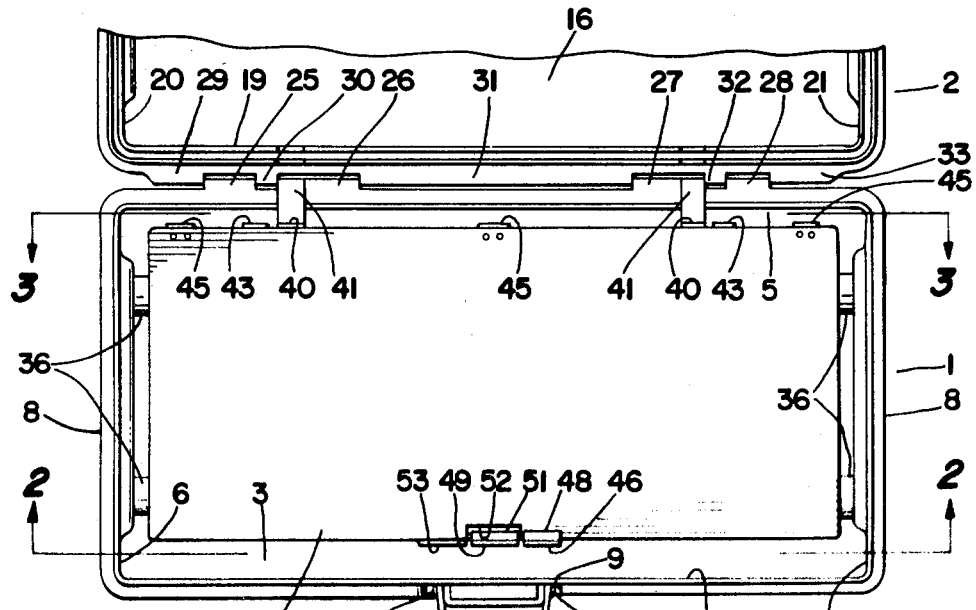
Figure 2:
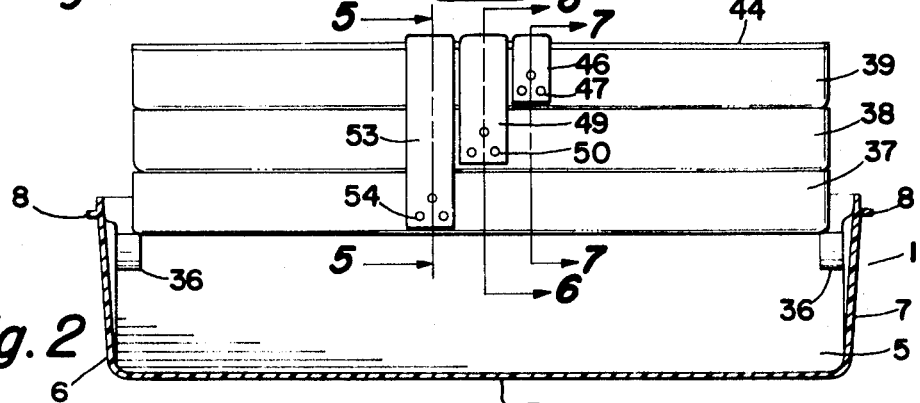
FIG. 2 is a cross-sectional view, taken on the line 2—2 of FIG. 1.

Referring more particularly to the drawings, the fishing tackle box will be seen to comprise a body or lower portion, generally designated by reference numeral 1, and a cover, generally designated by reference character 2.

The body portion 1 is preferably molded or formed of plastic or other material, and comprises a bottom 3, sides 4 and 5, and ends 6 and 7. The body portion 1 is also provided with a flange or shoulder 8 which extends completely around the body 1, except for a space, indicated at 9 in FIG. 1, which is left for the reception of a toggle latching mechanism.

Figure 4:
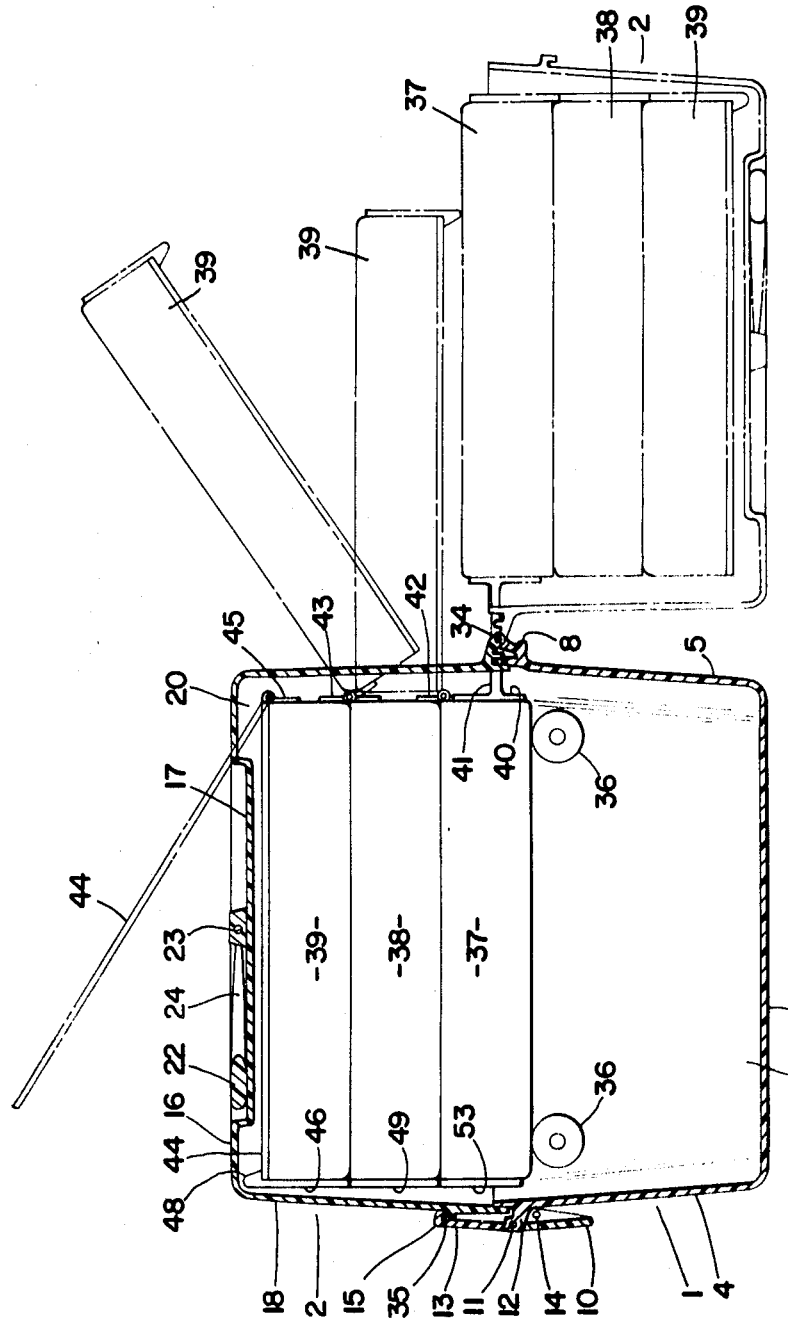
FIG. 4 is a transverse cross-sectional view of the box, in closed condition, but showing, in broken lines, the cover of the box, in fully open position, and showing, also in broken lines, various positions of the trays.

This toggle latching mechanism, as best seen in FIGS. 1 and 4, consists of a locking lever 10, which is hinged to a pin 11, mounted in a bracket 12 formed integrally with the side 4, and a lever 13, which is pivoted to the locking lever 10, as at 14, and has a hook-like flange 15, which serves a purpose to be presently described.

The cover 2 of the box is also preferably molded or formed of plastic or other material, and comprises a top 16, having a recessed central portion 17, sides 18 and 19, and ends 20 and 21. A carrying handle 22 is provided, which is pivoted to pin or shaft 23, mounted in a bar 24, which is secured to the recessed central portion 17 of the top 16. The handle 22 is, as shown in FIG. 4, disposed entirely within the recessed portion 17, when the box is not being carried, but may be rotated to an upright position, when the box is to be carried or transported.

For the purpose of pivotally connecting or hinging the cover 2 to the body or lower portion 1 of the box, the flange or shoulder 8 of the latter has formed integrally therewith upstanding spaced hinge plates 25, 26, 27 and 28 (see FIG. 1), and the cover 2 of the box is similarly provided with hinge plate portions 29, 30, 31, 32 and 33, and a hinge pin 34 is provided (see FIG. 4), which extends through all of the hinge plates 25 to 33 inclusive.

The side 18 of the cover 2 is also provided with a catch 35, which, when the box is in closed condition, as shown in FIG. 4, and the bottom edge of the cover rests on the flange 8, is adapted to be engaged by the flange 15, for the purpose of latching the cover 2 to the body 1. This toggle clamping or locking action, is effected by an inward movement of the locking lever 10 to the position shown in FIG. 4.

The box, as thus described, with the exception of certain modifications to be presently described, is somewhat conventional, and forms no part of the invention per se, although its description, at least to the extent given, is necessary for a complete understanding of the invention.

The ends 6 and 7 of the body or lower portion 1 of the box have secured thereto buttons or circular elements 36, which extend inwardly, are disposed closely adjacent the upper edge of the body 1, and provide a support for a tier of trays 37, 38 and 39, the tray 38 being superimposed on the tray 37, and the tray 39 being superimposed on the tray 38, so that the tray 38 provides a cover for the open top tray 37, and the tray 39 provides a cover for the open top tray 38.

Each of the trays 37, 38 and 39 is provided with suitable partitions (not shown) which divide each tray into compartments or receptacles for fishing bait and other items customarily used by fishermen.

The tray 37 has secured to that side thereof which is adjacent the side wall 5 of the body 1 a pair of spaced T-shaped elements 40 (see FIGS. 1, 3, 4 and 8), the stems 41 of which extend through cut-away portions of that portion of the side 5 above the flange 8, and are pivotally connected to the hinge pin 34.

Figure 3:
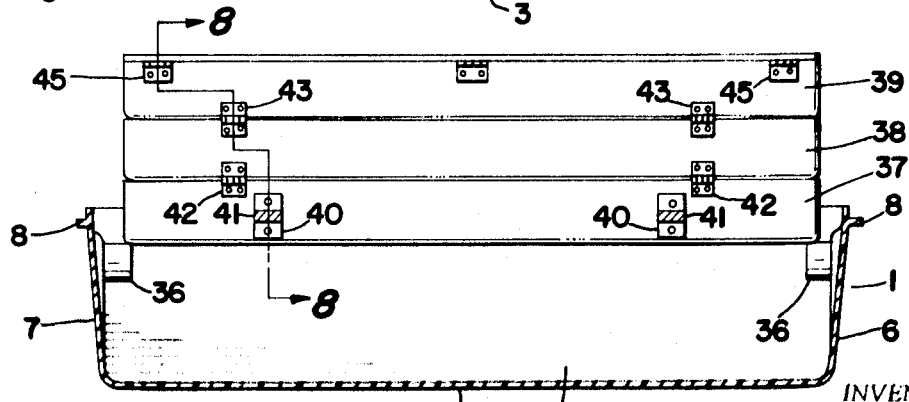
FIG. 3 is a cross-sectional view, taken on the line 3—3 of FIG. 1.
Figure 8:
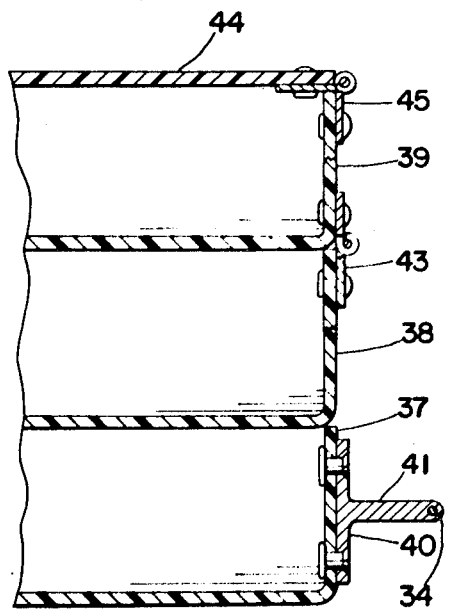
FIG. 8 is a fragmentary cross-sectional view, taken on the line 8—8 of FIG. 3.

The tray 38 is hinged to the tray 37 by means of hinges 42 (see FIGS. 3 and 4), and the tray 39 is hinged to the tray 38 by means of hinges 43 (see FIGS. 3 and 8).

The tray 39 is provided with a flat lid 44, which is hinged to the tray 39 by means of hinges 45 (see FIGS. 1, 3, 4 and 8).

Figure 5:
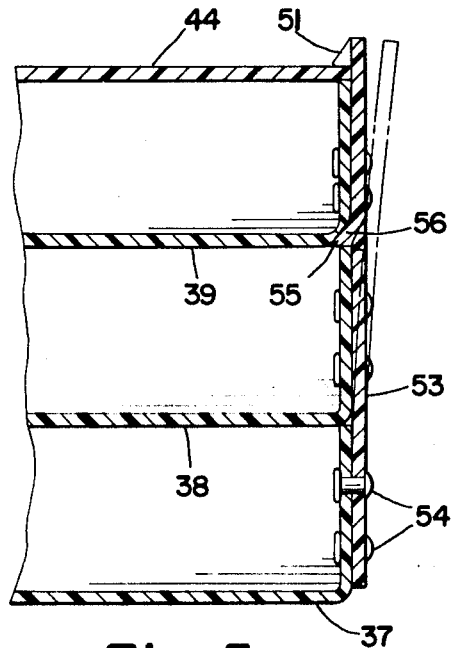
FIG. 5 is a fragmentary cross-sectional view, taken on the line 5—5 of FIG. 2.
Figure 6:
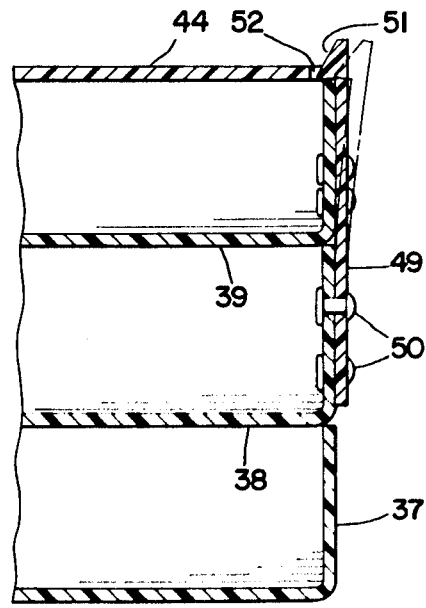
FIG. 6 is a fragmentary cross-sectional view, taken on the line 6—6 of FIG. 2.
Figure 7:
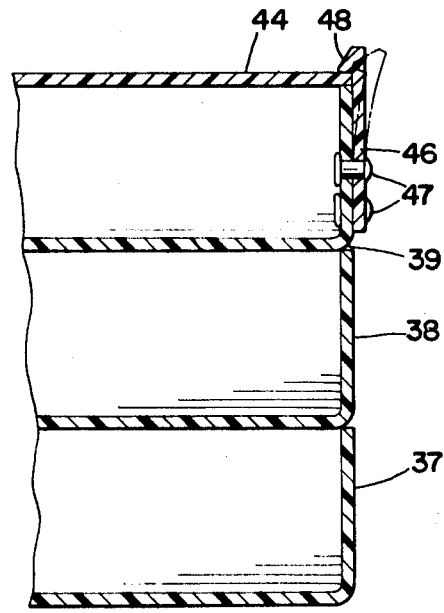
FIG. 7 is a fragmentary cross-sectional view, taken on the line 7—7 of FIG. 2.

Referring to FIGS. 1, 2, 5, 6 and 7, the lid 44 of the tray 39 is latched to the tray by means of a latch plate 46, of plastic material, which is riveted to the tray by means of rivets 47, and is provided at its upper end with a flange 48, which, in the normal solid line position of the plate, as shown in FIG. 7, maintains the lid in latched condition. When access to the contents of the tray 39 is desired, the plate 46 is flexed to the position shown in broken lines in FIG. 7, so that the lid 44 may be swung to an open position, as indicated by the broken lines in FIG. 4.

During the aforesaid opening of the lid 44, the tray 39 is not moved from the tray 38, this being prevented by a latch plate 49, of plastic material, which is riveted to the tray 38 by means of rivets 50, and is provided at its upper end with a flange 51, which, in the normal solid line position of the plate, as shown in FIG. 6, maintains the tray 39 against movement, due to the engagement of the flange with the upper edge of the tray. The lid 44 is provided with a cut-out 52 in the lid 44 (see FIGS. 1 and 6) which permits the flange 51 to engage the upper edge of the tray 39 without interfering with the lifting of the lid 44. When access to the contents of the tray 38 is desired, the plate 49 is flexed to the position shown in broken lines in FIG. 6, so that the tray 39 may be swung to either of the open positions, as indicated by the broken lines in FIG. 4. This, it may be noted, is accomplished without causing the lid 44 to be released from the tray 39.

During the aforesaid movement of the tray 39, the tray 38 is not moved from the tray 37, this being prevented by a latch plate 53, of plastic material, which is riveted to tray 37 by means of rivets 54, and is provided with a flange 55, which, in the normal solid line position of the plate, as shown in FIG. 5, maintains the tray 38 against movement, due to the engagement of the flange 55 with the upper edge of the tray. It is noted that a portion of the tray 39 is cut away or omitted, as at 56, to accommodate entry of the flange 55. When access to the contents of the tray 37 is desired, the plate 53 is flexed to the position shown in broken lines in FIG. 5, so that both trays 39 and 38 may be swung in a clockwise direction, as viewed in FIG. 4, to a position approximately 180 degrees from that shown. This, it may be noted, is accomplished without causing the tray 39 to be released from the tray 38.

It should be noted that the arrangement of trays which has been described, and their support on the elements 36 leaves a substantial amount of space within the body portion 1 of the box, below the tier of trays. This space is particularly useful for storage of flashlights and other small items used by fishermen, and which items are not usually carried in the bait trays. These items are held in place or against undue movement by the tray 37.

At the same time, the tier of trays extends upwardly to an extent, as seen in FIG. 4, that they virtually fill the cover 2 of the box, thereby not only utilizing virtually all of the available space within the cover, but enabling the cover to protect the trays.

When access to the space within the body portion 1 of the box is desired, the entire assemblage of trays may be swung about the pin 34 as a unit to the position shown in broken lines within the cover 2, in FIG. 4 of the drawings. This is accomplished without releasing the trays from each other or the lid 44 from the tray 39.

It is further noted that when the cover of the box is in the open position shown in FIG. 1, that access to the trays may be had without any necessity of reaching into the portions 1 and 2 of the box, in order to release or properly position the trays for access thereto or to the latching mechanism.

It is thus seen that I have provided a fishing tackle box of unique design, having a tier of trays so arranged and latched to each other as to not only permit ready access to any tray, without disturbing the other trays, but also to permit ready access to space within the box below the trays, or without releasing the trays from each other.

It is also seen that I have provided an arrangement of trays so positioned or supported within the box as to provide substantial space within the box for items not usually carried in the trays.

It is further seen that I have provided novel latching mechanism for latching the trays to each other and the cover to the uppermost tray, such mechanism occupying virtually none of the space within the box.

A further advantage resides in the fact that when the box is in the fully open position, as shown in FIG. 1, and irrespective of whether the trays are in the solid line position shown in FIG. 4, or in the broken line position shown in FIG. 4, should the box be accidentally or inadvertently overturned, the contents of the trays will not fall out.

It is to be understood that the form of my invention, herewith shown and described, is to be taken as a preferred example of the same, and that various changes may be made in the shape, size and arrangement of parts thereof, without departing from the spirit of the invention or the scope of the subjoined claims.

Having thus described my invention, I claim:

1. A fishing tackle box comprising a body portion having a bottom, sides and ends, and open at the top, a cover having a top, two sides and two ends, and open at the bottom, said cover being of substantially the same depth as said body portion, and being pivotally secured along the lower edge of one of its sides to the upper edge of one of the sides of said body portion, whereby said cover may be swung away from said body portion and into a position laterally of and insubstantially the same plane as said body portion, whereby said open bottom of said cover faces upwardly and lies in substantially the same plane as said open top of said body portion, a plurality of trays including a lowermost tray, with each tray, other than said lowermost tray, superimposed on the tray therebeneath, with the lowermost tray supported by said body portion at a position adjacent the plane defined by the upper edge of said body portion, a lid for the uppermost tray, means for pivotally securing the lowermost tray for pivotal movement about the axis of pivotal movement of said cover, means for pivotally securing each tray, other than the lowermost tray to the tray immediately therebeneath, and means for pivotally securing said lid to the uppermost tray, said last two-named means having their axes of pivotal movement parallel with the axis of pivotal movement of said cover and disposed at the same side of the trays and lid at which said lowermost tray is pivotally secured to said cover, whereby all of said trays and said lid are movable into said cover when said cover has been swung into said position laterally of said body portion.

2. A fishing tackle box, as defined in claim 1, including means for latching each tray to the tray immediately therebeneath, and means for latching said lid to the uppermost tray.

3. A fishing tackle box, as defined in claim 2, wherein the latching means for the tray immediately above the lowermost tray is secured to the lowermost tray, the latching means for the uppermost tray is secured to the tray immediately below the uppermost tray, and the latching means for said lid is secured to the uppermost tray.

4. A fishing tackle box, as defined in claim 3, wherein all of said latching means are secured to said trays at the sides thereof opposite to the sides at which the trays and lid are hingedly secured to each other.

5. A fishing tackle box, as defined in claim 4, wherein each of said latching means comprises a flexible plate having a hook-like flange extending from one face of said plate.

6. A fishing tackle box having at least two trays, one of which is arranged directly above the other, with the lower tray open at the top and the upper tray constituting a cover for the lower tray, a lid for the upper tray, means pivotally securing the upper tray to the lower tray, means pivotally securing said lid to the upper tray, said pivotal securements disposed at the same side of said trays and lid, whereby the lid and the upper tray may be swung away individually to expose the contents of the tray immediately therebeneath, first latching means for latching the upper tray to the lower tray, said first latching means comprising a substantially flat flexible latch plate secured to the lower tray at the side thereof opposite that at which said pivotal securement is disposed, said latch plate extending upwardly past said upper tray and lid, said upwardly extending portion of the plate provided with means for engaging the upper edge of the upper tray to retain the upper tray against pivotal movement away from the lower tray, said upwardly extending portion being normally self-biased into latching position, and adapted to be flexed away from the upper tray to thereby release said upper edge engaging means and permit the upper tray to be moved away from the lower tray, and second latching means for latching the lid to the upper tray, said second latching means comprising a flexible latch plate secured to the upper tray at the side thereof opposite that at which said pivotal securement is disposed, said last-named latch plate extending upwardly past said lid, said upwardly extending portion of the last-named latch plate provided with means for engaging the upper surface of the lid to retain the lid against pivotal movement away from the upper tray, said upwardly extending portion of said last-named latch plate being normally self-biased into latching position, and adapted to be flexed away from the lid to thereby release said lid upper surface engaging means and permit the lid to be moved away from the upper tray.

7. A fishing tackle box, as defined in claim 6, including a third tray over which said lower tray is superimposed, said third tray being open at the top and said lower tray constituting a cover for the third tray, means disposed at the same side of said trays at which said pivotal securements are disposed for pivotally securing said lower tray to said third tray, whereby said lid and upper and lower trays may be swung away from the third tray to expose the contents of said third tray, third latching means for latching the lower tray to the third tray, said third latching means comprising a substantially flat flexible latch plate secured to the third tray at the side thereof opposite that at which said pivotal securement is disposed, said third latch plate extending upwardly past said lower and upper trays and said lid, said upwardly extending portion of said third latch plate provided with means for engaging the upper edge of said lower tray to retain the lower tray against pivotal movement away from the third tray, said upwardly extending portion of said last-named latch plate being normally self-biased into latching position, and adapted to be flexed away from the lower tray to thereby release said upper edge engaging means from said lower tray and permit the lower tray to be moved away from the third tray.

References Cited

UNITED STATES PATENTS

| | | | |
|---|---|---|---|
| 1,954,127 | 4/1934 | Harsted | 312—200 |
| 2,501,879 | 3/1950 | Sulentic | 190—30X |
| 2,936,066 | 5/1960 | Meksula | 206—16R |
| 3,005,671 | 10/1961 | Majeski | 206—16RX |
| 3,155,231 | 11/1964 | Vinas | 312—201X |
| 3,330,608 | 7/1967 | Druger, Jr. | 312—200X |
| 3,410,018 | 11/1968 | Woolworth | 206—16EX |

GEORGE E. LOWRANCE, Primary Examiner

S. E. LIPMAN, Assistant Examiner

U.S. Cl. X.R.

190—30; 206—16E; 220—17; 312—200, 201